United States Patent
Osborne

(10) Patent No.: US 7,318,309 B2
(45) Date of Patent: Jan. 15, 2008

(54) VARIABLE SPEED TRANSMISSION TWIST CONTROL APPARATUSES AND METHODS FOR SELF-PROPELLED MOWING MACHINE

(75) Inventor: Christopher M. Osborne, Hillsborough, NC (US)

(73) Assignee: Honda Motor Co., Ltd, Tokyo (JP)

(*) Notice: Subject to any disclaimer, the term of this patent is extended or adjusted under 35 U.S.C. 154(b) by 259 days.

(21) Appl. No.: 11/125,843

(22) Filed: May 10, 2005

(65) Prior Publication Data

US 2005/0252185 A1   Nov. 17, 2005

Related U.S. Application Data

(63) Continuation-in-part of application No. 10/751,801, filed on Jan. 5, 2004.

(51) Int. Cl.
*A01D 69/00*   (2006.01)

(52) U.S. Cl. .................... 56/10.8; 180/19.3

(58) Field of Classification Search .......... 56/10.8, 56/14.7, 16.7, DIG. 18, 10.9, 11.3, 11.8, 56/10.5; 180/19.3, 19.1; 74/501.6, 502.2
See application file for complete search history.

(56) References Cited

U.S. PATENT DOCUMENTS

| | | | |
|---|---|---|---|
| 1,902,524 A | 3/1933 | Roth | |
| 2,417,613 A | 3/1947 | Radabaugh | |
| 3,841,069 A | 10/1974 | Weck | |
| 4,306,405 A | 12/1981 | Fleigle | |
| 4,704,847 A | 11/1987 | Greider et al. | |
| 4,930,369 A * | 6/1990 | Barnard et al. | 74/480 R |
| 4,936,160 A | 6/1990 | Barnard et al. | |
| 5,261,214 A | 11/1993 | Wollersheim | |
| 5,913,802 A | 6/1999 | Mullet et al. | |
| 6,047,614 A | 4/2000 | Beugelsdyk et al. | |
| 6,796,392 B2 * | 9/2004 | Kobayashi et al. | 180/19.3 |
| 2002/0153179 A1 | 10/2002 | Kobayashi et al. | |

FOREIGN PATENT DOCUMENTS

| | | |
|---|---|---|
| EP | 0 419 175 | 3/1991 |
| EP | 1 198 980 | 4/2002 |
| EP | 1 550 364 | 7/2005 |
| GB | 2 166 636 | 5/1986 |
| WO | WO 98/10205 | 3/1998 |

OTHER PUBLICATIONS

Extended European Search Report for corresponding European Application No. 06 00 6418 dated Jul. 31, 2006.
European Search Report for European Application No. 04 03 0988 dated Mar. 6, 2005.
European Search Report for corresponding European Application No. 04 03 0988 dated Jan. 5, 2006.

* cited by examiner

*Primary Examiner*—Árpád Fábián Kovács
(74) *Attorney, Agent, or Firm*—Jenkins, Wilson, Taylor & Hunt, P.A.

(57) ABSTRACT

Apparatuses and methods are provided for controlling a self-propelled machine, such as a lawn mowing machine, including a housing, a handle attached to the housing, and a prime mover attached to the housing with a variable speed transmission for propelling the mowing machine. A variable speed twist control is provided including an elongate body moveable in a twisting manner, the body having an inner channel adapted for guiding a cable control connector operatively connected to the variable speed transmission through a cable for controlling the variable speed transmission, whereby self-propelled speed of the mowing machine can be controlled by operating the twist control.

15 Claims, 6 Drawing Sheets

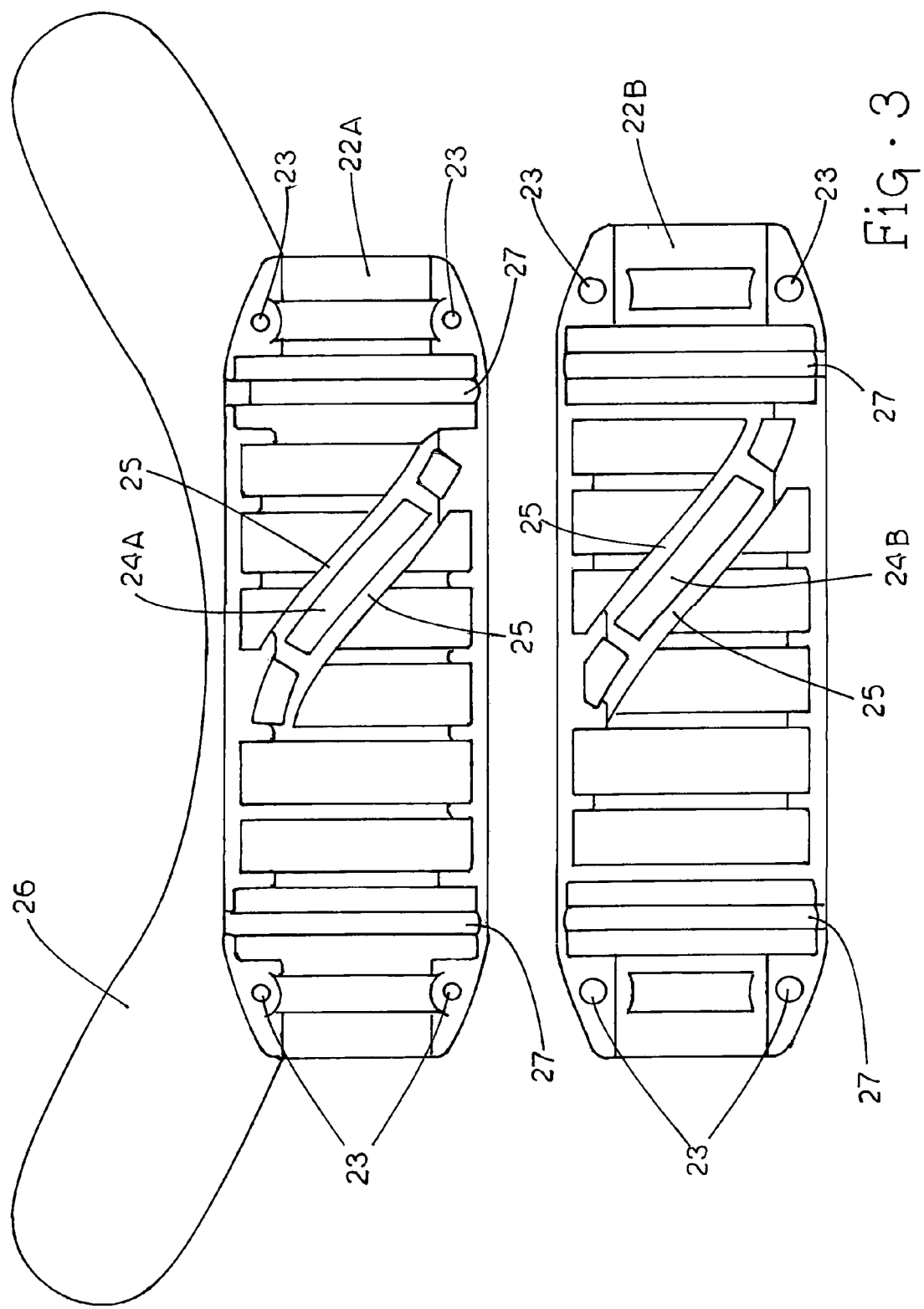

VARIABLE SPEED TRANSMISSION TWIST CONTROL APPARATUSES AND METHODS FOR SELF-PROPELLED MOWING MACHINE

RELATED APPLICATIONS

This application is a continuation-in-part of and claims priority to U.S. patent application Ser. No. 10/751,801, filed Jan. 5, 2004, the disclosure of which is incorporated herein by reference in its entirety.

TECHNICAL FIELD

The subject matter disclosed herein relates generally to apparatuses and methods for controlling operation of self-propelled machines, and more particularly to providing a variable speed twist control for controlling a variable speed transmission of self-propelled machines such as lawn mowing machines.

BACKGROUND ART

Self-propelled machines, such as lawn mowing machines and the like, often provide handles on which controls are mounted for engagement and/or manipulation by operators or users of such machines. In particular, a "walk behind" type, self-propelled mowing machine typically has a handle extending behind a power plant or other main operative assembly of the machine for gripping by an operator as the operator walks behind the machine during movement thereof in a forward direction. Typically, one or more controls are mounted toward the end of the handle in a convenient location for the user to manipulate while gripping the handle and operating the machine. One such control is the operator presence control or "dead man" control, which generally includes a spring-biased handle which can be grasped by the operator during normal operation of the machine to enable the motor of the machine. If the operator presence control handle is thereafter released, the machine action is rapidly terminated for reasons of safety. Another well-known control is the speed control, which for self-propelled mowing machines is generally connected to a variable speed transmission associated with the engine and controls the speed of the self-propelled traction wheels. These speed controls typically comprise a lever pivotally mounted onto the machine handle such that the speed of the self-propulsion can be controlled by moving the lever back and forth, which often requires the operator to remove one hand from the handle in order to operate the speed control. These independent systems also typically require the operator to control two or more separate functions while operating the machine. Unfortunately, recent marketing research indicates that many consumers of self-propelled machines would prefer a minimum number of control mechanisms requiring manipulation during operation of such machines in order to simplify use of the machines.

Many examples exist of conventional machines that utilize multiple separate controls during the engagement and running of the machine. U.S. Pat. No. 4,281,732 to Hoch discloses a lawn mower with a control mechanism for a propelled-drive clutch wherein the control mechanism includes a dead-man control lever which operates to hold a clutch-control lever in a clutch-engage position only when the dead-man control lever is held in a lever holding position. The lawn mower is operated in a manner that upon release of the dead-man control lever, the dead-man control lever automatically moves to a lever-release position which permits the clutch-control lever to automatically move to a clutch-disengaged position. U.S. Pat. No. 4,309,862 to Carlson discloses an operator presence control belt that holds in place a throttle control lever wherein the throttle control lever can be moved forward after the operator presence control belt is engaged. A spring loaded detent on the end of the operator presence control belt holds the throttle control lever in an engaged position until the operator presence control is released such that the throttle lever and operator presence control are interlocked.

U.S. Pat. No. 4,327,539 to Bricko et al. discloses the use of a single belt to operate both the drive system and the clutch system for outdoor power equipment. The belt is first rotated counter clockwise to cause a hook to catch on a finger of the drive lever, then as the belt is rotated in a clockwise direction the hook causes the drive lever to rotate and a pin engages a recess in the clutch lever to cause the clutch to engage. Yet another patent related to prior operator presence control and drive systems is U.S. Pat. No. 4,466,232 to Beugelsdyk et al. which discloses a compact safety control assembly for lawnmowers having a cable actuated clutch between the motor and the blade which includes a dead-man function along with a operating mechanism requiring two distinct steps for engaging the clutch and initiating rotation of the lawnmower blade.

Twist-grip throttle control systems have been used for years in the motorcycle-like vehicle and outboard marine engine fields. For example, U.S. Pat. No. 4,019,402 to Leonheart discloses a motorcycle throttle twist-grip control unit that is connected by a Bowden cable to the carburetor of the motorcycle. Likewise, U.S. Pat. No. 4,133,193 to Sanada et al. discloses a throttle grip locking device of a motorcycle having at one end of a handle a rotary throttle grip to control the operation of the engine wherein, when the engine is stopped, the throttle grip would be locked so as to be non-rotatable. U.S. Pat. No. 4,191,065 to Golobay et al. discloses a twistable type throttle grip assembly especially adapted for use with motorcycle-like vehicles wherein the throttle grip assembly manipulates a single control cable and is normally operational in a first rotational range for controlling the supply of fuel to the vehicles internal combustion engine thereby controlling the vehicle speed.

Regarding the outboard marine motor field, U.S. Pat. No. 5,545,064 to Tsunekawa et al. discloses a throttle and transmission control assembly adapted to be mounted on the tiller of an outboard motor for controlling its transmission and throttle wherein both the transmission and throttle controls employ devices that convert rotary into reciprocating motion and which amplify the reciprocating motion so as to permit a compact assembly. U.S. Pat. No. 6,093,066 to Isogawa et al. describes an outboard motor throttle and transmission control that employs a Bowden wire mechanism for transmitting control signals from the tiller handle to the engine throttle and transmission control. A twist-grip throttle control and a pivotally supported transmission control are mounted on a tiller arm and are connected by a Bowden wire actuating mechanism to the respective components of an outboard motor. Finally, U.S. patent application No. US2001/0046819 to Kawai et al. discloses an outboard motor featuring a compact throttle control and transmission shifting control on a handle connected to a tiller. The throttle control mechanism includes a twist-grip throttle control that is connected to a throttle control shaft that is journalled by a first bearing and a second bearing in a suitable manner for changing the speed of the engine.

Therefore, it would advantageous to employ a variable speed twist control that is operatively connected to a variable speed transmission of a self-propelled mowing machine to control the speed of propulsion. The twist control can allow for various hand positions for ease of operation and can be used in conjunction with an operator presence control for engine control and engagement of the speed system.

SUMMARY

According to one embodiment, a variable speed, self-propelled mowing machine comprises a housing and a handle attached to the housing. A prime mover is also attached to the housing with a variable speed transmission for propelling the mowing machine. The machine further comprises a variable speed twist control comprising an elongate body moveable in a twisting manner, the body having an inner channel adapted for guiding a cable control connector operatively connected to the variable speed transmission through a cable for controlling the variable speed transmission and self-propelled speed of the mowing machine.

According to another embodiment, a variable speed, self-propelled mowing machine comprises a housing having front, rear, upper and lower portions and a handle attached to the rear upper portion of the housing. An engine is attached to the upper portion of the housing for providing power to the mowing machine. The mowing machine further comprises a variable speed transmission and a variable speed twist control operatively connected to the variable speed transmission through a cable for controlling the variable speed transmission and self-propelled speed of the mowing machine. The variable speed twist control comprises an elongate body substantially coaxial with a portion of the handle and moveable in a twisting manner. The body comprises an upper portion and a lower portion wherein each of the upper and lower portions has an inner helical channel for receiving and guiding a pinion cable control connector operatively connected to the cable whereby rotating the twist control body causes the pinion to traverse at least partially within the channels to move the cable. The twist control further comprises a guide bracket disposed between the twist control body and the handle for guiding the pinion cable control connector in a direction at least generally parallel with the portion of the handle coaxial with the twist control. The guide bracket comprises an upper portion and a lower portion wherein each of the upper and lower portions defines a slot therein for passage of at least a portion of the pinion therethrough.

Methods are also provided for controlling propulsion speed of a self-propelled mowing machine. The methods generally comprise providing a variable speed, self-propelled mowing machine with a housing having a prime mover attached to the housing with a variable speed transmission for propelling the mowing machine. A handle can be attached to the housing. The mowing machine provided can further include a variable speed twist control comprising an elongate body moveable in a twisting manner. The body of the variable speed twist control can have an inner channel adapted for guiding a cable control connector operatively connected to the variable speed transmission through a cable. The methods further generally comprise rotating the twist control to control the variable speed transmission whereby the variable speed transmission controls the propulsion speed of the self-propelled mowing machine.

It is therefore an object to provide variable speed twist control apparatuses and methods for controlling a variable speed transmission of a self-propelled machine, such as a lawn mowing machine.

An object having been stated hereinabove, and which is achieved in whole or in part by the subject matter disclosed herein, other objects will become evident as the description proceeds when taken in connection with the accompanying drawings as best described hereinbelow.

BRIEF DESCRIPTION OF THE DRAWINGS

FIG. 3 is a side elevation view of the inside of the twist control elongate body upper and lower portions of the twist control illustrated in FIGS. 2A-2C.

DETAILED DESCRIPTION

Figure 1A:
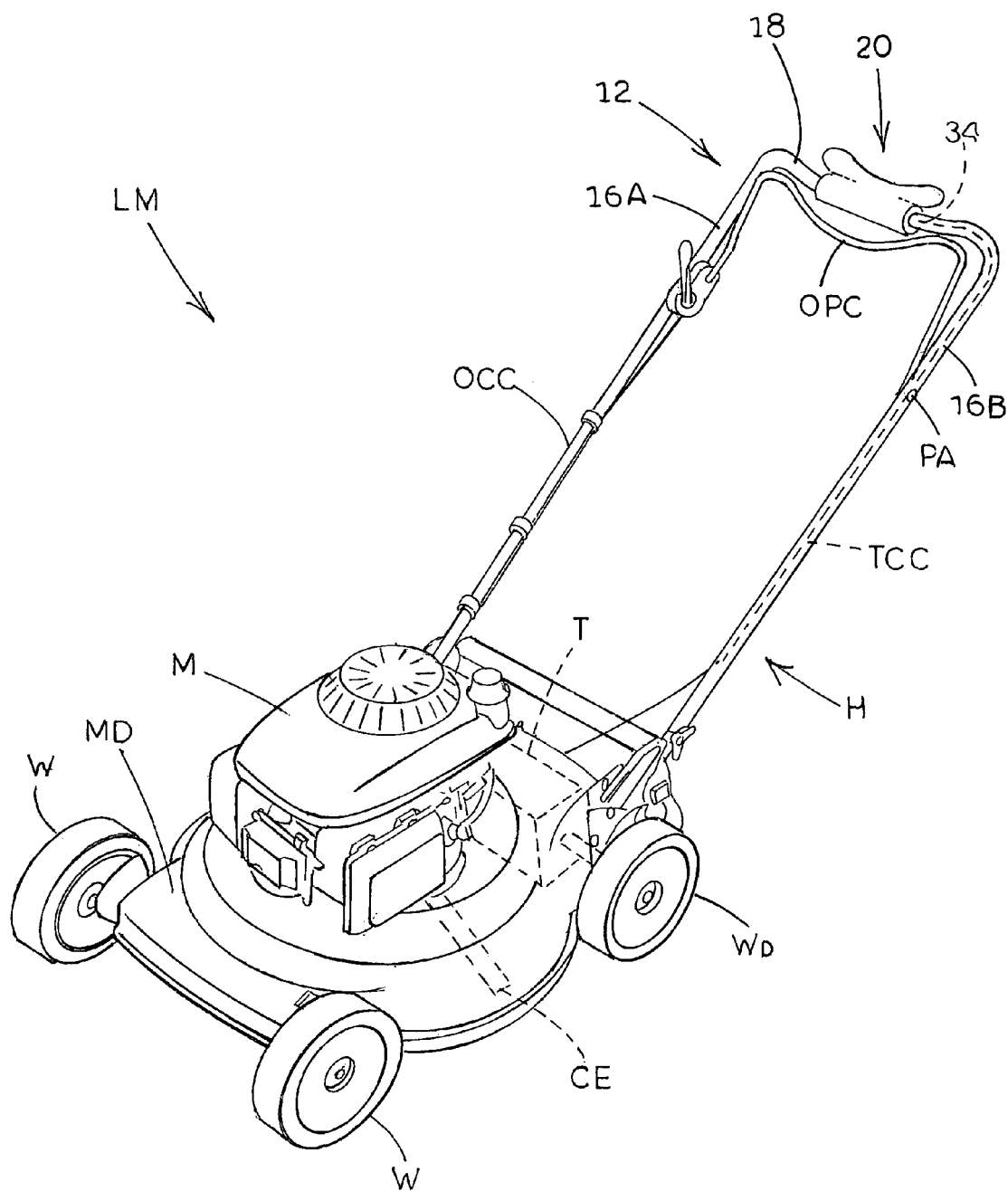
FIG. 1A is a perspective view of a self-propelled mowing machine including an embodiment of a variable speed twist control provided in accordance with the subject matter disclosed herein.
Figure 1B:
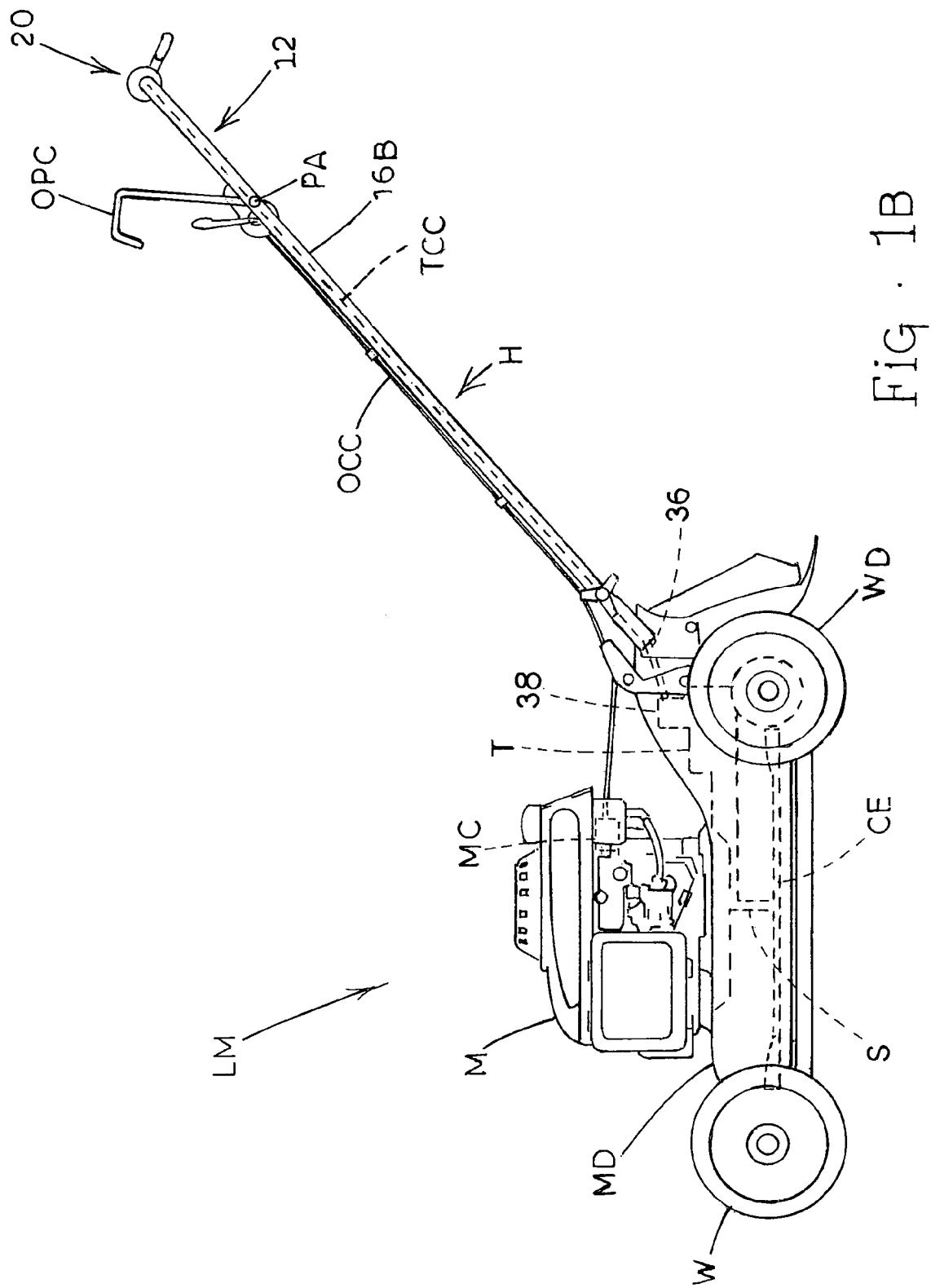
FIG. 1B is a side elevation view of the machine illustrated in FIG. 1A.

Referring now to FIGS. 1A and 1B, a self-propelled lawn mowing machine, generally designated LM is illustrated by way of example. Lawnmower LM can comprise any suitable configuration generally known to persons skilled in the art or later developed. In the exemplary embodiment, lawnmower LM includes a housing such as a mower deck MD, which can include a front portion, a rear portion, an upper exterior portion, and a lower, interior portion. A handle generally designated H is coupled to the rear portion of mower deck MD by any suitable means, and extends upwardly therefrom at an angle appropriate for comfortable grasping and manipulation by an operator. Handle H provides an area to be gripped by an operator and includes a proximal end section, generally designated 12, which is the section farthest away from the main operational components of lawn mower LM, such as prime mover or motor M and transmission T. In one embodiment, proximal end section 12 of handle H can be generally U-shaped, and thus can include first and second spaced-apart legs 16A and 16B, respectively, joined by a central portion 18.

Mower deck MD is supported for rolling movement over a surface by a set of wheels and can include one or more idle (non-driving) wheels, such as wheels W, and one or more driving wheels, such as driving wheels WD. The embodiment is not limited to which one or more of wheels W functions as driving wheel or wheels WD, although typically the rearmost wheel or wheels serve this function.

Lawnmower LM can also include a powered drive system or assembly. The powered drive system can include any suitable prime mover such as motor M, which can be an electric motor or an internal combustion engine. The drive system can further include a transmission T illustrated in phantom in FIGS. 1A and 1B. Both motor M and transmission T can be mounted to the upper exterior portion of mower deck MD in a suitable manner. As shown in FIG. 1B, an output shaft S (shown in phantom) of motor M can rotate a suitable cutting element CE which can be any suitable cutting mechanism such as a blade or blades or disposed within the interior portion of mower deck MD. Motor M also can transfer power to driving wheels WD through transmission T in any suitable manner, thereby rendering lawnmower LM self-propelled in response to control by an operator. Torque from output shaft S can, for example, be transferred to an input shaft (not shown) of transmission T via an endless belt (not shown). Torque from the input shaft can be transferred to an additional output shaft (e.g., an axle or half-shaft coupled to respective driving wheels WD) through an appropriate reducing or transfer means such as a gear set (not shown). Transmission T can be a variable-speed transmission, and can more particularly be a continuously variable-speed transmission. As appreciated by persons skilled in the art, by providing an appropriate control mechanism further defined herein, an operator can control the output speed of a continuously variable-speed transmission, and thus the speed of driving wheels WD, over a continuous or substantially continuous range between a zero or LOW speed and a maximum or HIGH speed.

The different types, structures, and functions of components of lawnmower LM in addition to those described above are known to persons skilled in the art, and therefore are not further described.

As illustrated in FIGS. 1A and 1B, lawnmower LM includes an operator presence control OPC which can be pivotably coupled or attached to handle H at a suitable pivot axis PA which can comprise an axle, pin, bolt, dowel, or the like. Preferably, operator presence control OPC is disposed at or near proximal end section 12 of handle H (i.e., the portion of handle H proximate to an operator in the course of typical use of lawnmower LM) to facilitate manipulation by an operator. As shown in FIG. 1B, operator presence control OPC can communicate with a machine control component MC that is designed for enabling and disabling an engine as appreciated by those skilled in the art. Operator presence control OPC can communicate with machine control component MC through an operator control cable OCC. Operator control cable OCC can be any suitable elongate component, of cable or non-cable material, that is either flexible or rigged and capable of transferring a force or actuation by translation and/or a change in tension. A non-limiting example of operator control cable OCC is a cable, such as a Bowden wire, at least a portion of which is typically encased and extends through a coaxial sheath.

As appreciated by persons skilled in the art, operator presence control OPC in general is a safety feature that is typically movable between two states or positions, ON and OFF, and typically is biased towards its OFF state. When an operator is operating or manipulating lawnmower LM in an intended matter, such as by properly gripping handle H and pulling operator presence control OPC toward handle H, operator presence control OPC is in the ON position, and this action translates through the length of operator control cable OCC to machine control component MC. The ON position permits machine control component MC to activate motor M and cutting element CE and permits lawnmower LM to be propelled using the power generated by motor M as transferred by transmission T. When, on the other hand, an operator is not operating or manipulating lawnmower LM in an intended matter, such as by releasing or failing to properly grip operator presence control OPC, operator presence control OPC is in the OFF position. The OFF position disables machine control component MC and therein disables motor M, cutting element CE, and/or transmission T. In some embodiments and as known to those of skill in the art, a biasing mechanism (not shown) can be employed to bias operator presence control OPC to the OFF position. For example, operator control cable OCC could be biased at some point along its length to maintain a force that tends to pull operator presence control OPC away from handle H to the angled OFF position. As another example, a biasing force could be applied to machine control component MC and transferred through operator control cable OCC to yield the same result.

As illustrated in FIGS. 1A and 1B, lawnmower LM further includes a variable speed twist control generally designated 20. Twist control 20 can be rotatably coupled or attached to handle H and can be disposed at or near a proximal end section 12 of handle H, preferably in the center of central portion 18.

Twist control 20 communicates with transmission T through a transmission control cable TCC, which similar to operation control cable OCC can be any suitable elongate component capable of transferring a force or actuation by translation and/or a change in tension (i.e., a Bowden wire). As illustrated and discussed in detail with reference to FIGS. 2A-2C and 4A-4C, transmission control cable TCC can have a proximal end 34 and a distal end 36 (also illustrated in FIG. 1B), wherein proximal end 34 can include a cable control attachment 35, shown as a ring, that can be attached to a cable control connector 42, such as a pinion, for operative connection with twist control 20.

Transmission control cable TCC can run or extend from twist control 20 to transmission T on the outside of handle H typically encased and extended through a coaxial sheath. Transmission control cable TCC can also run or extend on the inside of handle H as shown in FIGS. 1A and 1B, or can run or extend with portions of transmission control cable TCC on both the inside and outside of handle H.

Referring now to FIGS. 2A-2C and 3, twist control 20 can include an elongate body 22 (FIG. 2B) that can be cylindrical in shape and comprise an upper portion 22A and a lower portion 22B. Upper portion 22A and lower portion 22B can be joined together in any suitable manner, such as, for example, with fasteners (not shown) seated within fastener holes 23. It is also envisioned in accordance with the present disclosure that upper portion 22A and lower portion 22B can be formed as a unitary structure. Elongate body upper portion 22A can further include one or more tabs or engagement portions 26 extending from elongated body upper portion 22A or attached thereto.

Engagement portions 26 can be elongated tabs fused to opposing ends of elongate body upper portion 22A, providing a surface that an operator can push with one or more of the operator's thumbs in order to rotate twist control 20 through the range of operational states. It is also envisioned that twist control 20 can be configured such that engagement portions 26 extend from lower portion 22B or from both upper portion 22A and lower portion 22B.

Elongate upper and lower body portions 22A, 22B can each further comprise an inside surface channel 24A, 24B, respectively, adapted for guiding cable control connector 42 for controlling variable speed transmission T as described below. Channels 24A, 24B can be defined within raised walls 25 or as any other suitable configuration such as, for example, recessed channels. Channels 24A, 24B can further be at least partially helical in nature as positioned on and disposed about the inner peripheral surfaces of elongate body portions 22A, 22B, respectively.

Elongate body portions 22A, 22B can each further comprise a bracket channel 27 on opposing ends of each for use in rotating elongate body 22 around handle central portion 18 as will be described in further detail below. Bracket channels 27 can likewise be formed as raised-wall channels or recessed channels.

Figure 2A:
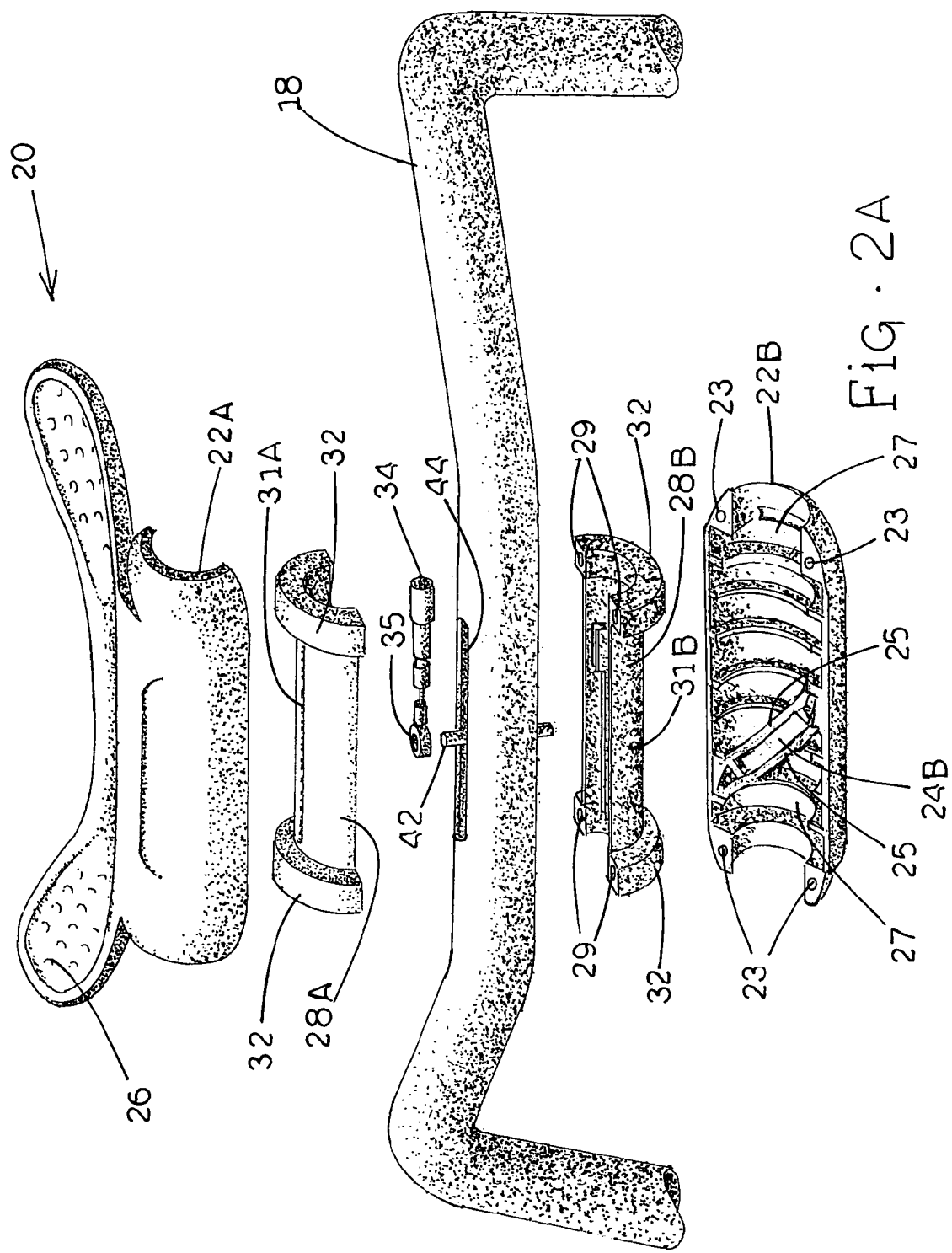
FIGS. 2A-2B are perspective exploded views of the upper section of a mowing machine handle illustrating an embodiment of the variable speed twist control provided in accordance with the subject matter disclosed herein.
Figure 2B:
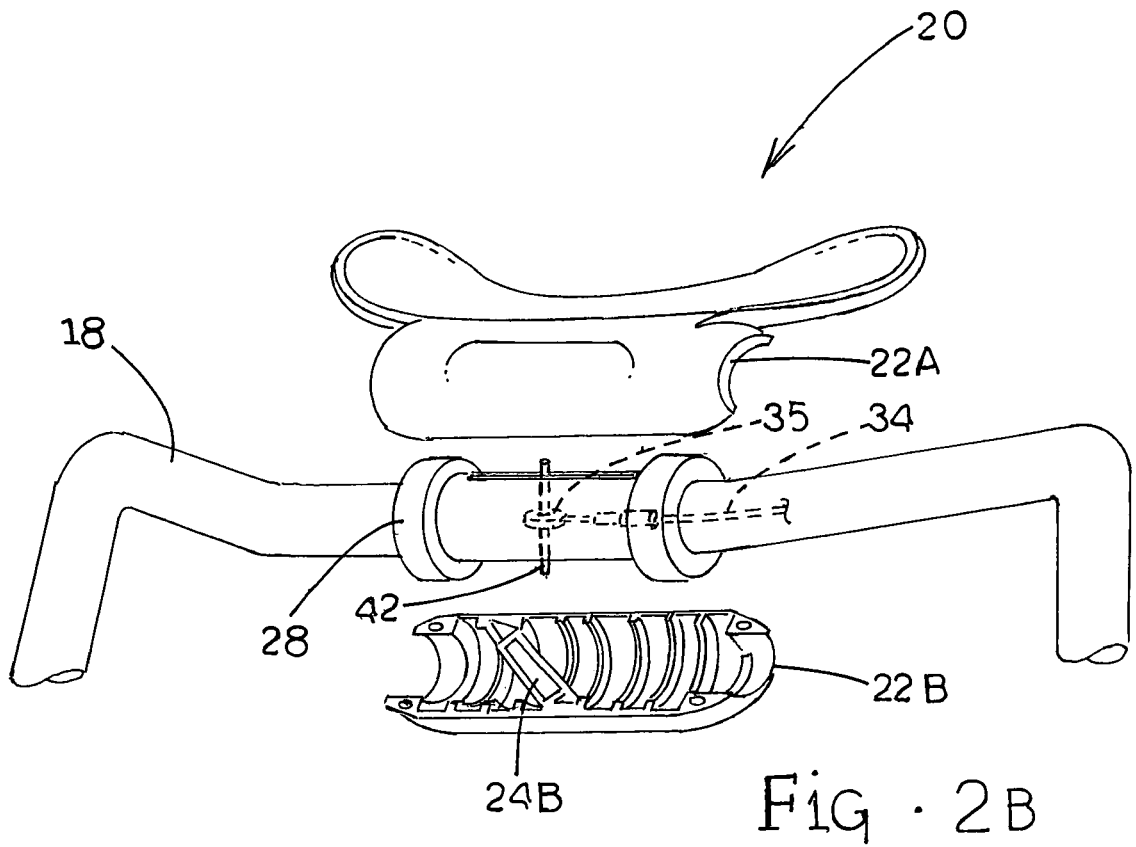
Figure 2C:
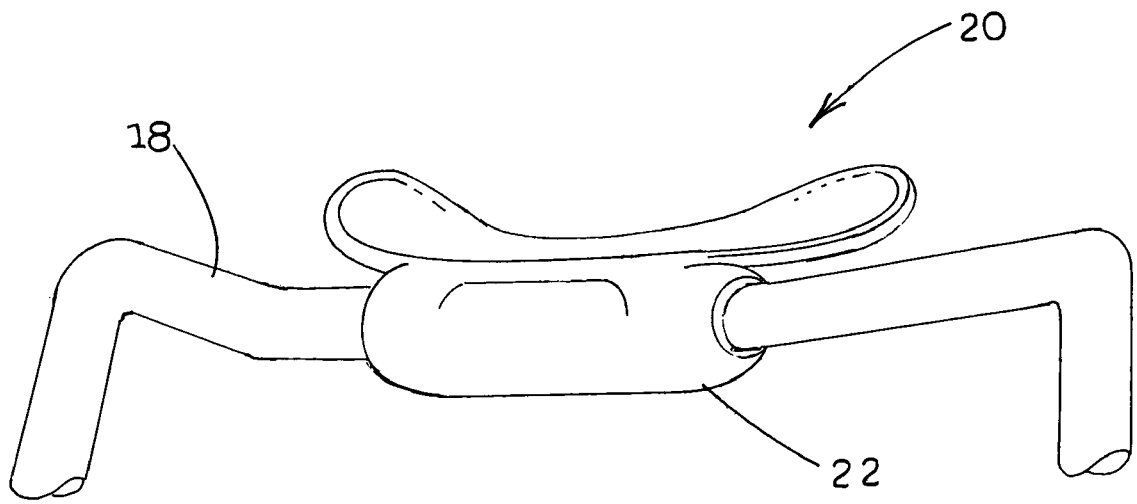
FIG. 2C is a perspective view of an assembled upper section of the mowing machine handle shown in FIGS. 2A and 2B.

Twist control 20 can further include a guide bracket 28 (shown assembled in FIG. 2C) that can be generally cylindrical in shape and comprise an upper portion 28A and a lower portion 28B as shown in FIG. 2A. Upper portion 28A and lower portion 28B can be joined together in any suitable manner, such as, for example by fasteners (not shown) seated within fastener holes 29. It is also envisioned that upper portion 28A and lower portion 28B can be formed as a unitary structure. Guide bracket 28 is adapted for placement or positioning between elongate body 22 and handle central portion 18 wherein elongate body 22 is capable of rotating around guide bracket 28 when twisted by a user. For example, guide bracket upper and lower portions 28A, 28B can each further comprise a bracket shoulder 32 on each opposing end. Each bracket shoulder 32 is capable of seating within each respective bracket channel 27 on elongate body portions 22A, 22B, wherein elongate body 22 is rotatable around guide bracket 28.

Guide bracket portions 28A, 28B each further define slots 31A, 31B, respectively, through which at least a portion of cable control connector 42 can pass. Slots 31A, 31B, along with slot 44 in handle central portion 18, guide cable control connector 42 in a direction for movement in a direction at least generally parallel with handle central portion 18 when twist control 20 is operated. The positioning of at least a portion of cable control connector 42 within guide bracket slots 31A, 31B and handle slot 44, allows guide bracket 28 to remain in a non-rotatable fixed position around handle central portion 18, while elongate body 22 is cable of rotating around guide bracket 28 and handle central portion 18 through the seating of guide bracket shoulders 32 within bracket channels 27. Furthermore, the positioning of at least a portion of cable control connector 42 within guide bracket slots 31A, 31B and handle slot 44, allows cable control connector 42 to interact with inside surface channels 24A, 24B of elongate body portions 22A, 22B, respectively, for controlling variable speed transmission T as described below.

Actuation and the position of twist control 20 can determine the speed at which lawnmower LM is self-propelled. Twist control 20 is movable between a NEUTRAL state at which the speed of lawnmower LM can be zero, a LOW state at which the speed of lawnmower LM can be a low speed, and a HIGH state at which the speed of lawnmower LM can be at a maximum operating speed. Twist control 20 often is movable to intermediate states between the LOW and HIGH states. In a preferred embodiment, twist control 20 can rotate from approximately 90 degrees to approximately 180 degrees when rotating between a NEUTRAL state and a HIGH state.

In lawnmowers equipped with continuously variable-speed transmissions, the throttle of motor M (when provided as an internal combustion engine) is typically fixed at a constant or substantially constant setting (i.e., the speed of the motor is constant, such as 3100 rpm) during normal cutting operations. Often, this throttle setting corresponds to an optimized motor speed at which components of motor M can rotate in a balanced manner with minimal vibration, while maintaining the effectiveness of cutting element CE. Nonetheless, as appreciated by persons skilled in the art, provision can be made for adjusting the throttle in special circumstances, such as to a choke setting for improved start-up conditions.

As shown in FIG. 1B, due to the normally constant throttle setting, twist control 20 typically interfaces with transmission T through a transmission control component 38 to adjust one or more components thereof. Accordingly, distal end or end section 36 of transmission control cable TCC is illustrated in FIG. 1B as being connected to transmission control component 38, which in turn is integrally attached to transmission T. Depending on the particular design of transmission T, transmission control component 38 can be mechanically associated with a cam, variable-pitch pulley, dog clutch, cone clutch, friction or pressure plate, gear, fluid control circuit, brake and/or other suitable device as appreciated by persons skilled in the art. The NEUTRAL state of twist control 20 can correspond to a condition in which such a device decouples power transfer between motor M and transmission T.

In some embodiments, twist control 20 can be biased to the NEUTRAL position by a biasing mechanism (not shown). For example, transmission control cable TCC can be biased at some point along its length to maintain a force that tends to rotate twist control 20 into the NEUTRAL position. As another example, a biasing force could be applied to transmission control component 38 and transferred through transmission control cable TCC to yield the same result.

Figure 4A:
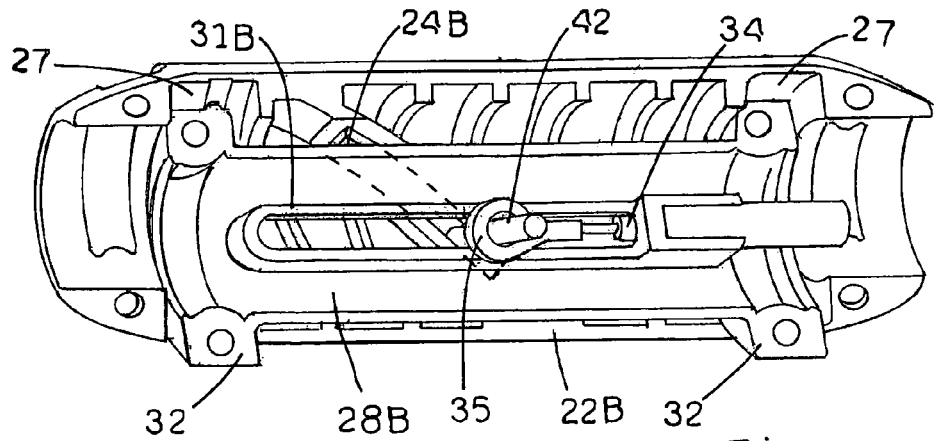
FIGS. 4A-4C are side elevation views of the twist control elongate body lower portion operatively fitted against the twist control guide bracket lower portion illustrating progressive views of rotation of the elongate body lower portion around the guide bracket to move the pinion cable control connector.
Figure 4B:
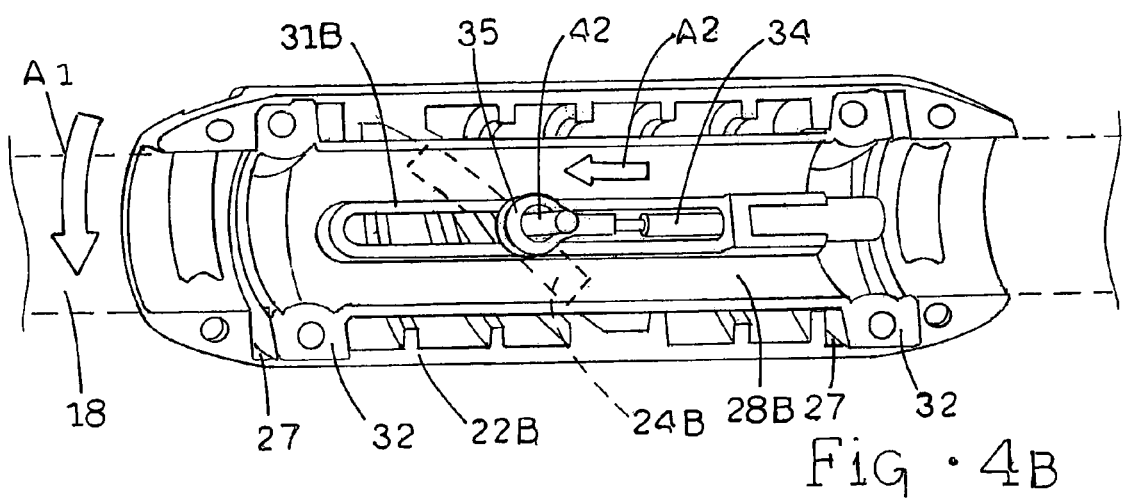
Figure 4C:
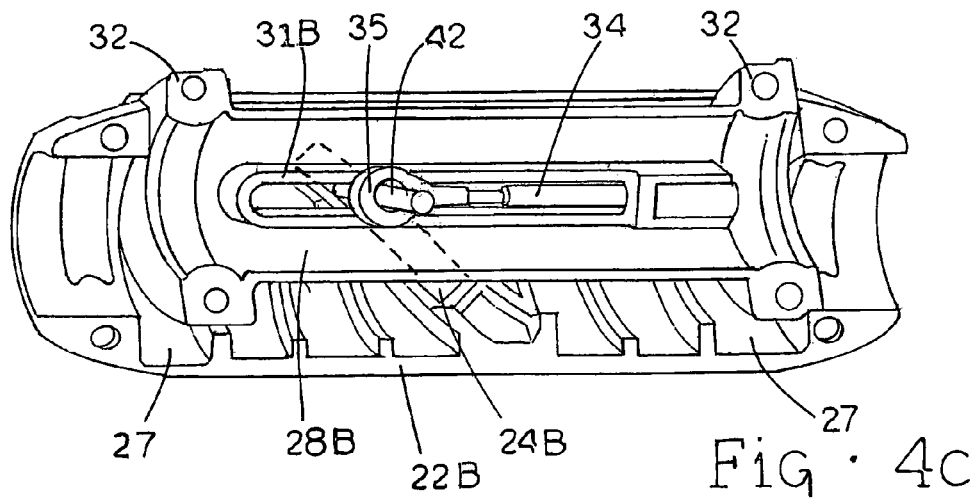

With reference to FIGS. 4A-4C, the operation and positioning of twist control 20 to actuate transmission control cable TCC and control the speed of a lawnmower will now be described. While FIGS. 4A-4C depict the operation of twist control 20 through illustrations of cable control connector 42 operating within elongate body lower portion 22B and guide bracket lower portion 28B, it is understood that the operation of twist control 20 typically requires the operation of cable control connector 42 within both elongate body portions 22A, 22B and both guide bracket portions 28A, 28B when twist control 20 is rotated about central portion 18 of handle H.

FIG. 4A shows twist control 20 in a zero speed NEUTRAL position at which no power is transferred by transmission T from motor M to driving wheels WD. Such an embodiment is useful for preventing lawnmower LM from jerking forward immediately upon startup or when an operator otherwise desires for lawnmower LM forward movement to cease. Depending on the type of transmission T with which twist control 20 is interfaced, the zero speed NEUTRAL position can, if desired, involve a physical detachment in the power transmission path between motor M and driving wheel WD, such as the disengagement of a clutch, or a stoppage in rotation of some critical component such as through application of a braking or friction device. At this NEUTRAL position, cable control connector 42 can be located within a point in channel 24B closest towards transmission T, thereby causing cable control attachment 35 and proximal end 34 of transmission control cable TCC to be in a position closest to transmission T wherein transmission T is disabled.

After motor M has been activated, an operator can rotate twist control 20 to initiate and increase speed of transmission T and subsequent forward movement of lawnmower LM. As shown in FIG. 4B, an operator can rotate twist control 20 by causing elongate body 22 (represented in FIG. 4A-4C by elongate body lower portion 22B) to rotate around fixed guide bracket 28 (represented in FIG. 4A-4C by guide bracket lower portion 28B) in the direction of arrow A1. While slot 31B in guide bracket lower portion 28B acts as a guide (along with handle slot 44) to direct cable control connector 42 in a direction generally parallel with handle central portion 18, cable control connector 42 is forced along within channel 24B as twist control 20 is further rotated. This travel or motion within channel 24B causes cable control connector 42 to move cable control attachment 35 and transmission control cable proximal end 34 in a direction of arrow A2, thereby moving proximal end 34 of transmission control cable TCC to a position further from transmission T. This action increases the speed of transmission T and the forward speed of lawnmower LM.

An operator can adjust the speed of lawnmower LM by rotating twist control 20 within the linear range of travel between an extreme LOW speed position and an extreme HIGH speed position. As shown in FIG. 4C, when twist control 20 is at least approximately in its HIGH speed position, cable control connector 42 is located within a point in channel 24B furthest from transmission T. This positioning causes proximal end 34 of transmission control cable TCC to be in a position furthest from transmission T wherein transmission T is at its highest speed and self-propelled movement of lawnmower LM is at its highest speed.

Upon completion of mowing activity or in any situation when self-propulsion of lawnmower LM must be slowed down or stopped, an operator can merely release twist control 20. Tension in the cable assembly can then allow elongate body 22 to rotate back around guide bracket 28 in a direction opposite that of arrow A1 shown in FIG. 4B. This action causes cable control connector 42 to traverse within channel 24 in an opposite manner of that when increasing forward speed, thereby moving cable control attachment 35 and transmission control cable proximal end 34 back to a position closest to transmission T (the NEUTRAL position). Upon reaching the NEUTRAL position (FIG. 4A), transmission T is disabled and assisted propelling forward movement of lawnmower LM will cease.

It will be understood that various details of the disclosed subject matter may be changed without departing from the scope of the disclosed subject matter. Furthermore, the foregoing description is for the purpose of illustration only, and not for the purpose of limitation.

What is claimed is:

1. A variable speed, self-propelled mowing machine comprising:
   (a) a housing having a prime mover attached to the housing with a variable speed transmission for propelling the mowing machine;
   (b) a handle attached to the housing;
   (c) a variable speed twist control comprising an elongate body moveable in a twisting manner, the body having an inner channel adapted for guiding a cable control connector operatively connected to the variable speed transmission through a cable for controlling the variable speed transmission, whereby self-propelled speed of the mowing machine can be controlled by operating the twist control; and
   (d) wherein the twist control body further comprises an upper portion and a lower portion and wherein the upper and lower portions each has an inner channel.

2. The self-propelled mowing machine according to claim 1 wherein the twist control body further comprises at least one engagement portion attached to the twist control body upper portion to rotate the twist control.

3. The self-propelled mowing machine according to claim 2 wherein the twist control body comprises two engagement portions on opposing ends of the twist control body upper portion.

4. A variable speed, self-propelled mowing machine comprising:
   (a) a housing having a prime mover attached to the housing with a variable speed transmission for propelling the mowing machine;
   (b) a handle attached to the housing;
   (c) a variable speed twist control comprising an elongate body moveable in a twisting manner, the body having an inner channel adapted for guiding a cable control connector operatively connected to the variable speed transmission through a cable for controlling the variable speed transmission, whereby self-propelled speed of the mowing machine can be controlled by operating the twist control; and
   (d) wherein the cable control connector is a pinion mechanism connected to the cable, and the cable control connector is disposed at least partially within the inner channel whereby rotating the twist control body causes the pinion to traverse within the channel to provide movement to the cable;
   (e) wherein the twist control further comprises a guide bracket disposed between the twist control body and the handle for guiding the pinion cable control connector in a direction at least generally parallel with the portion of the handle coaxial with the twist control; and
   (f) wherein the guide bracket further comprises an upper portion and a lower portion wherein the upper and lower portions each defines a slot therein for passage of at least a portion of the pinion therethrough.

5. A variable speed, self-propelled mowing machine comprising:
   (a) a housing having front, rear, upper and lower portions;
   (b) a handle attached to the rear upper portion of the housing;
   (c) an engine attached to the upper portion of the housing;
   (d) a variable speed transmission for propelling the self-propelled mowing machine; and
   (e) a variable speed twist control operatively connected to the variable speed transmission through a cable for controlling the variable speed transmission whereby self-propelled speed of the self-propelled mowing machine can be controlled by operating the twist control, and wherein the twist control comprises:
      (i) an elongate body substantially coaxial with a portion of the handle and moveable in a twisting manner, the body comprising an upper portion and a lower portion wherein the upper and lower portions each has an inner helical channel for receiving and guiding a pinion cable control connector operatively connected to the cable whereby rotating the twist control body causes the pinion to traverse at least partially within the channels to provide movement to the cable;
      (ii) two engagement portions on opposing ends of the twist control body upper portion; and
      (iii) a guide bracket disposed between the twist control body and the handle for guiding the pinion cable control connector in a direction at least generally parallel with the portion of the handle coaxial with the twist control, the guide bracket comprising an upper portion and a lower portion and wherein the upper and lower portions each defines a slot therein for passage of at least a portion of the pinion therethrough.

6. The self-propelled mowing machine according to claim 5 wherein the twist control is rotatable between a neutral position where the variable speed transmission is disengaged and the mowing machine is at rest, and an engaged position where the variable speed transmission is engaged and the mowing machine is self-propelled.

7. The self-propelled mowing machine according to claim 6 wherein the twist control is further rotatable in the engaged position between a low position at which the variable speed transmission is set to a minimum speed and a high position at which the variable speed transmission is set to a maximum speed.

8. The self-propelled mowing machine according to claim 7 wherein the twist control is rotatable through an arc of at least about 90 degrees.

9. The self-propelled mowing machine according to claim 8 wherein the twist control is rotatable from at least about 90 degrees to about 180 degrees.

10. The self-propelled mowing machine according to claim 5 further comprising:
   (a) a machine control component for enabling and disabling the engine; and
   (b) an operator presence control operatively connected to the machine control component for controlling the machine control component whereby enabling and disabling of the engine can be controlled by operating the operator presence control.

11. The self-propelled mowing machine according to claim 10 wherein the operator presence control is translatable between a neutral or off position and an engaged or on position.

12. The self-propelled mowing machine according to claim 11 wherein the engaged position enables the machine control component and wherein the neutral position disables the machine control component.

13. The self-propelled mowing machine according to claim 10 further comprising a cutting element disposed within the lower portion of the housing and rotatably coupled to the engine.

14. A variable speed twist control for controlling a variable speed transmission comprising:
   (a) an elongate body moveable in a twisting manner and comprising an upper portion and a lower portion wherein each portion has an inner helical channel for receiving and guiding a pinion cable control connector operatively connected to the variable speed transmission through a cable whereby rotating the twist control body causes the pinion to traverse at least partially within the channels to provide simultaneous and equal movement to the cable; and
   (b) a guide bracket disposed between the twist control body and the handle for guiding the pinion cable control connector in a direction at least generally parallel with the axis of the twist control body, the guide bracket comprising an upper portion and a lower portion and wherein the upper and lower portions each defines a slot therein for passage of at least a portion of the pinion therethrough.

15. A method for controlling a variable speed transmission comprising:
   (a) providing a variable speed twist control comprising:
      (i) an elongate body moveable in a twisting manner and comprising an upper portion and a lower portion and wherein the upper and lower portions each has an inner helical channel for receiving and guiding a pinion cable control connector operatively connected to the variable speed transmission through a cable; and
      (ii) a guide bracket disposed between the twist control body and the handle for guiding the pinion cable control connector in a direction at least generally parallel with the axis of the twist control body, the guide bracket comprising an upper portion and a lower portion and wherein the upper and lower portions defines a slot therein for passage of at least a portion of the pinion therethrough; and
   (b) rotating the twist control so that the pinion at least partially traverses within the channels to provide movement to the cable, thereby controlling the variable speed transmission.

* * * * *